UNITED STATES PATENT OFFICE.

BYRON E. ELDRED, OF BROOKLINE, MASSACHUSETTS.

PROCESS OF TREATING LIME.

SPECIFICATION forming part of Letters Patent No. 721,871, dated March 3, 1903.

Application filed June 4, 1902. Serial No. 110,207. (No specimens.)

*To all whom it may concern:*

Be it known that I, BYRON E. ELDRED, of Brookline, in the county of Norfolk and State of Massachusetts, have invented certain new and useful Improvements in Processes of Treating Lime, of which the following is a specification.

The object of this invention is to afford a method for slaking lime which shall yield the hydrate in a dry pulverulent form, free from quicklime, carbonate of lime, and uncombined water.

By my process, as hereinafter described, lime is so treated that all the oxid of lime (quicklime) is converted without the aid of artificial heat to the hydrate of lime in the form of a dry impalpable powder. This is accomplished as follows: Quicklime is slaked with an excess of water over that required to form the compound hydrate of lime. The lime thus slaked may be allowed to stand several days to age. During this time all the calcium oxid is converted into calcium hydroxid, which sets to a stiff paste or putty. I do not limit myself to the aging of the lime-putty. It may be used while freshly made. This lime-putty is then placed in a suitable mixing device equipped with stirring apparatus and is rapidly agitated, while quicklime, preferably ground or granulated, is added in amount sufficient to take up and combine with the excess of moisture present in the lime-putty. Reaction and heating occur, and the lime-putty is quickly transformed into a completely-hydrated dry powder, which is so finely divided and pulverulent that screening or grinding is unnecessary except in cases where quicklime containing a considerable amount of impurities has been employed. The ground quicklime added is completely hydrated simultaneously with the desiccation of the putty.

By a careful adjustment of the proportions of the lime-putty to ground lime a complete conversion of the mixture to the dry hydrate is secured. These proportions are dependent on the nature of the lime and the amount of water used in slaking; but I have obtained good results by making the lime-paste with one part of quicklime and two parts water, by weight, and then to four parts of the putty adding three parts of ground quicklime.

Instead of using anhydrous quicklime for drying the lime-putty I find it possible also to use for the purpose a partially-hydrated oxid containing about one chemical equivalent calcium oxid to one of calcium hydrate corresponding to the chemical compound $CaO.CaO_2H_2$. It is prepared by adding to ground quicklime the requisite amount of water to form the compound indicated by the formula. This partially-hydrated oxid exhibits desiccating properties similar to those of anhydrous oxid of lime, and in the drying of lime-putty the reaction proceeds more smoothly with the former than with the latter. The preparation of this partially-hydrated oxid of lime is not necessarily a distinct and separate operation. Its formation may be brought about simultaneously with the drying of the lime-putty by proceeding as follows: To the putty in a stirrer is added an excess of ground quicklime above that required to combine with the excess water. On stirring the mass the partially-hydrated oxid forms and the lime-putty is gradually dried. After a short time sufficient water is added to convert the partial hydrate $CaO.CaO_2H_2$ to the complete hydrate $CaO_2H_2$ and the stirring continued until a dry powder results. Suitable proportions for this method of preparation are four parts of the lime-putty to six parts of the ground quicklime, and one part of water added to the resulting mixture. By this method of desiccation with anhydrous or partially-hydrated quicklime it is evident that the impurities ordinarily present in slaked lime—viz., quicklime, moisture, and carbon dioxid—are practically eliminated. The process of ripening or aging the lime-putty with excess of water converts all oxid of lime to the hydrate, which would not be the case if quicklime were slaked with just sufficient water to produce the hydrate. Unconverted quicklime by the latter method is invariably present in the finished product, whereas by my process it is entirely absent, or at the most is present only in extremely small quantities. It is further evident that the addition of the ground quicklime during the operation of mixing may be so regulated that all the excess moisture present in the lime-putty is caused to enter into chemical combination with the ground lime. The putty is thus thoroughly dried and the process is under such complete control that the amount of ground quicklime required for chemical combination with the moisture, and only that amount, need be added.

The presence of carbon dioxid, which can scarcely be avoided in any process of drying lime-putty by direct heat, is of course avoided in my process of drying by chemical agency. I also avoid the generation of the excessively high temperature attendant in processes where anhydrous oxid of lime and water are mixed in amount only sufficient for the formation of hydroxid of lime. My process, therefore, allows of the production of a superior article.

What I claim as my invention, and desire to secure by United States Letters Patent, is—

1. The herein-described improvement in the art of slaking lime, consisting in treating moist slaked lime with sufficient dry quicklime to form a dry product, substantially as described.

2. The herein-described method of treating lime, which consists in slaking lime with an excess of water over that required for chemical combination and subsequently mixing with it sufficient quicklime to produce dry hydrate of lime, substantially as specified.

3. Process for making dry hydrate of lime, which consists in treating completely-slaked lime with partially-slaked lime, to form a dry product, substantially as described.

4. Process for making dry hydrate of lime, which consists in slaking quicklime to form a lime-putty and subsequently drying said putty by the addition of ground quicklime, substantially as described.

5. Process for making dry hydrate of lime, which consists in, first, slaking quicklime to a putty; second, aging the product; third, desiccating the product by incorporating sufficient ground quicklime to absorb chemically the excess of water, substantially as described.

6. Process for making dry hydrate of lime which consists in: slaking quicklime to a putty, then desiccating said putty by incorporating ground quicklime to absorb chemically the excess of water not evaporated by the heat of reaction in the production of hydrated oxids of lime substantially as described.

7. As an article of manufacture a dry, pulverulent, completely-hydrated oxid of lime which as quicklime has been slaked to a putty and desiccated with ground quicklime (which becomes a part of the product) substantially as described.

In testimony whereof I have affixed my signature in presence of two witnesses.

BYRON E. ELDRED.

Witnesses:
CARLETON ELLIS,
WILLIAM ODLIN.